United States Patent Office.

JOHN COMMINS, OF CHARLESTON, SOUTH CAROLINA.

Letters Patent No. 99,294, dated February 1, 1870.

IMPROVEMENT IN FERTILIZERS.

The Schedule referred to in these Letters Patent and making part of the same.

*To all whom it may concern:*

Be it known that I, JOHN COMMINS, of Charleston, and State of South Carolina, have invented a new and improved compound, to be used as a Fertilizer; and I do hereby declare that the following is a full and exact description thereof.

The nature of my invention consists in combining, in suitable proportions, with blood, the liquor which results from the distillation of coal in the manufacture of illuminating-gas, and also a small quantity of sulphuric acid, which latter will coagulate the compound, and adapt it to serve, when properly dried and reduced to a powder, as a fertilizer, to be used alone or with phosphates, as will be hereinafter explained.

The following is a description of my improved fertilizer:

I take, say, one part, by measure, of gas-liquor, and three parts of blood, and add to these about one five-hundredth part of sulphuric acid, which latter will coagulate the mass.

This compound is then dried, by natural or artificial heat, and reduced to a powder, in which condition it is ready for use.

I am aware that blood and gas-liquors have been separately used as fertilizers, or as the component parts of fertilizers, but I am not aware that these two substances have ever been combined, before my invention, in such proportions as would produce a fertilizer.

The gas-liquor serves as a preservative of the blood, and is also a good fertilizer itself, by its furnishing ammonia.

The compound may be used in a liquid state, but will be found valuable in a dried powder, mixed with phosphates instead of guano.

I prefer to adopt the relative proportions herein mentioned, as I have obtained thereby the best results, but I do not confine myself to these proportions, as more or less of the blood may be used.

Having described my invention—

What I claim as new, and desire to secure by Letters Patent, is—

A fertilizer-compound, of the ingredients, mixed together, in the proportions substantially as described.

JOHN COMMINS.

Witnesses:
J. E. BURKE,
D. W. SPRATE.